(12) United States Patent
Gibson

(10) Patent No.: US 9,143,500 B1
(45) Date of Patent: Sep. 22, 2015

(54) CLOUD DATA STORAGE ACCESS VERIFICATION METHOD UTILIZING A VARIABLE ASSIGNING REQUEST STRING GENERATOR AND RECEIVER ALGORITHM

(71) Applicant: Jeffrey S. Gibson, Tyronza, AR (US)

(72) Inventor: Jeffrey S. Gibson, Tyronza, AR (US)

(73) Assignee: VARSGEN, LLC, Memphis, TN (US)

( * ) Notice: Subject to any disclaimer, the term of this patent is extended or adjusted under 35 U.S.C. 154(b) by 85 days.

(21) Appl. No.: 14/217,253

(22) Filed: Mar. 17, 2014

Related U.S. Application Data

(60) Provisional application No. 61/802,347, filed on Mar. 15, 2013.

(51) Int. Cl.
*G06F 21/00* (2013.01)
*H04L 29/06* (2006.01)

(52) U.S. Cl.
CPC ............... *H04L 63/08* (2013.01); *H04L 63/10* (2013.01)

(58) Field of Classification Search
CPC ............................... H04L 63/08; H04L 63/10
See application file for complete search history.

(56) References Cited

U.S. PATENT DOCUMENTS

| | | | |
|---|---|---|---|
| 9,092,778 | * 7/2015 | Gibson | 1/1 |
| 2002/0111886 A1* | 8/2002 | Chenevich et al. | 705/30 |
| 2005/0165684 A1* | 7/2005 | Jensen et al. | 705/44 |
| 2008/0011825 A1* | 1/2008 | Giordano et al. | 235/380 |

* cited by examiner

*Primary Examiner* — Lisa Lewis
(74) *Attorney, Agent, or Firm* — Hulsey, Hunt & Parks, P.C.; William S. Parks

(57) ABSTRACT

A novel method of providing verifications for access to stored data programs within a cloud server protocol is provided. Such a method is operated through the implementation of a specific algorithm that permits a cloud server the means to communicate directly, reliably, safely, and nearly instantaneously with an individual (or his or her proxy) (at multiple contact points) for verification purposes in relation to an established data program stored within such a cloud server (whether in terms of written documentation, bank account, secure information, etc.). Such verifications may thus permit quick and reliable access to secured cloud programs such that only those individuals (or other entities) that are authenticated for such access through the utilization of such a verification procedure are permitted in such an instance.

4 Claims, 2 Drawing Sheets

100

AA – INDIVIDUAL: PROVIDES REQUESTED VOTER REGISTRATION APPLICATION DATA TO GOVERNMENT ISSUER

| 110

BB – GOVERNMENTAL ISSUER: DEVELOPS IMPORTABLE PROFILE MODEL; EXPORTS PROFILE INFORMATION INTO VARSGR; REPLACES CARD NUMBER WITH IDENTITY NUMBER; SETS RESPONSE CRITERIA BASED UPON DESIRED PROTOCOLS

| 120

CC – VARSGR: CREATES PROFILES USING INDIVIDUAL INFORMATION AND IMPORTED GOVERNMENTAL ISSUER INFORMATION; SENDS SECURE LOGIN AND PASSWORD INFORMATION FOR EACH PROFILE TO INDIVIDUAL AND ISSUER IN MODIFIABLE FORMAT

| 130

DD - ISSUER: VARSGR ALGORITHM SYSTEM IS READY TO USE FOR ALL VOTER REGISTRATION IDENTIFICATION CARD TRANSACTIONS

FIGURE 2

CLOUD DATA STORAGE ACCESS VERIFICATION METHOD UTILIZING A VARIABLE ASSIGNING REQUEST STRING GENERATOR AND RECEIVER ALGORITHM

CROSS-REFERENCE TO RELATED APPLICATION

This application claims priority of U.S. Provisional Patent Application 61/802,347, filed on Mar. 15, 2013, the teachings and disclosure thereof herein entirely incorporated by reference.

FIELD OF THE INVENTION

The present invention pertains to a novel method of providing verifications for access to stored data programs within a cloud server protocol. Such a method is operated through the implementation of a specific algorithm that permits a cloud server the means to communicate directly, reliably, safely, and nearly instantaneously with an individual (or his or her proxy) (at multiple contact points) for verification purposes in relation to an established data program stored within such a cloud server (whether in terms of written documentation, bank account, secure information, etc.). Such verifications may thus permit quick and reliable access to secured cloud programs such that only those individuals (or other entities) that are authenticated for such access through the utilization of such a verification procedure are permitted in such an instance. As such, this method best guarantees, with little to nonexistent interruption for the individual, verifications for such a secured cloud program. The overall system depends on a string variable method that accords a limited number of representations to all the words and numbers of a specific human language in order to provide a suitable machine language translation for the capability of communicating quickly and effectively between a cloud server and an access requesting individual. Such a process allows for instantaneous and reliable recognition and identification of such an access requesting individual simply by initiating electronic communication between such a person (or his or her proxy) and the pertinent cloud server in which the secured program is housed. Through a simple link between the digital communication platform set up by the variable string algorithm between the cloud server's system and at least one electronic device of the pertinent individual, and initiated to match the identity of at least one verification contact point to ensure the trustworthiness of a request for identification or other activity involving the subject secured cloud program itself, such communications, which do not require any need to divulge personal or other information of the individual, ensure such transactions are proper and verified. The ability to do so with substantially instantaneous, low-bandwidth communications provides a method that accords protection to all entities involved with minimal interruption for greater efficiencies, as well.

BACKGROUND OF THE PRIOR ART

Cloud computing is highly desirable as a means to permit direct access to certain documents, sites, accounts, by authorized individuals within a "communal" on-line setting. The ability to accord access in such a manner is growing in popularity, certainly, but with the noticeable lack of proper and effective protections for data programs uploaded and made available on such cloud servers. Certainly, there are some items provided within the cloud that are desirable in terms of unfettered access to all cloud participants. The problem exists, however, that certain programs are not permitted such access, leaving the desirable utilization of a cloud system, but with obstacles and impediments in terms of actual security for certain accounts, documents, information, etc. Password protections have been implemented in an effort to provide some degree of security in these situations; unfortunately, though, such efforts are far from reliable as hacking and other types of insidious actions can easily uncover and decipher such encoded devices.

As such, there are few methods and/or procedures employed today that allow for suitable and reliable protections of secured cloud data programs while still permitting authorized individuals access thereto in such a milieu. In order, then, to increase the secured utilization of the cloud in this respect, there remains a noticeable need to provide effective secured programs in this manner. A system that provides an overall verification method to ensure the reliability of each of these secured programs, with minimal involvement of the individual, with nearly instantaneous communication between parties, and without transferring any personal information of the individual to fulfill such verifications, would thus be highly desirable. The present invention provides such a method. A development that permits ease in not only implementation but utilization, coupled with complete (if not substantial) reliability that any such access request to a cloud server of a secured cloud data program is instantaneously verified, would be highly desired and could lead to greater utilization of the cloud for such purposes.

SUMMARY AND ADVANTAGES OF THE INVENTION

The present invention pertains to a novel method of providing direct communication verifications of a person's identity and ultimately their desire to access a secured cloud data program in a reliable fashion. The overall system depends on a string variable method that accords a limited number of representations to all the words and numbers of a specific human language in order to provide a suitable machine language translation for specific contact point identifications. The system then allows for electronic communications to be undertaken that request a response from a predetermined contact point group (of any population size) that meet a base criteria (in this situation, association with the identity of an individual). With the response from the address to which the communication is sent, the responder can be properly verified through the string variable algorithm that ensures the identification of the person (or other entity) responding in such a fashion is reliable. Thus, the string variable system permits the only needed capability to determine, in conjunction with the responder's verification contact points (such as cell phone number, IP address, and email address, at least), that each responder actually meets the initial communication request criteria required for authorization for a transaction to proceed. In this manner, as outlined below, such an algorithm allows for reliable and verified communications to occur under any type of prescribed protocol to ensure specific communications, responses, requests, etc., are made from and to required contact points in an instantaneous manner. With this background in place, there is provided, as described in greater detail below, an entire system allowing for the verification of entity identifications in relation to an access request to a secured cloud data program through the capability of allowing for reliable prescribed contact point communications such that the underlying system verifies the authenticity of the individual or other entity initiating any such requests, thus allowing for instantaneous response to and between the cloud server and/or access requesting individual (which may be of any type of entity for which verifications are provided).

The inventive system is advantageous in that it provides a remote wireless contact point for communication between a cloud server and an individual (i.e., again, any verifiable entity) that automatically recognizes that person and provides verification of identity to the cloud server for access purposes. With such a degree of reliability permitted through a simple connection between individual and cloud server, many other advantages are present as a result, including the capability of determining specific information in relation to the individual and the specific cloud data program automatically upon a request message sent from the cloud server itself. As well, the system provides the advantage to send automatic communications through a wireless protocol all through SMS messages. The system also permits other communications through email, text, phone call, etc. (including SMS, if desired), for such access verification purposes, as well. As noted above, such a system advantageously allows for an individual to directly and instantaneously receive verification notifications from the algorithm system with such verifications supplied based upon his or her profile criteria generated within a prior set-up between the individual, cloud server, and the algorithm system, with the capability of the individual and/or cloud server to modify verification contact criteria within such profiles subsequent to such an initial set-up (such as to permit communications of information to different individuals if the individual him- or her-self is not available to respond, or to increase the number of individuals permitted access to such a program through modifying the number of verifications involved through suitable contact point requests and responses). Additionally, as alluded to above, the inventive system may be operated through any electronic media resource, including texting, calling, emailing, etc., via phone technology, including, without limitation, VOIP, and even through an HTML log-in program on a computer (tablet, desk top, laptop, etc.), such as for primarily on-line activities and other like operations, without losing any degree of capability in terms of reliable recognition of the entities involved through a simple request and reply communication action. Still another advantage of the inventive method is the efficient manner of rapid reply to a request through the inventive algorithm that reduces individual identity, information, and other considerations, as well as individual identity verification requests to a machine language translation to permit such low-bandwidth communications for such a reliable, straightforward individual verification purpose.

Accordingly, this invention encompasses a computerized verification and communication method between an individual or his or her proxy and a cloud server, said method including the utilization of electronic communication devices by said entities and comprising the steps of:

1) initiating a protocol between said cloud server and said individual through an intermediary algorithm system in relation to a secured cloud data program for which said individual requests access within said cloud server, wherein said protocol includes the generation of a profile for said individual and a profile for said cloud server within said intermediary algorithm system, wherein said individual profile and said cloud server profile both include a unique number generated in relation to the identity of said individual, as well as verification contact point requirements to be undertaken by said intermediary algorithm system upon utilization of said cloud server for such an access request, and wherein said individual's personal information is not shared with or otherwise stored within said intermediary algorithm system;

2) establishing specific contact point identifications with said intermediary algorithm system through an initial communication with each required verification contact point within both profiles of said individual and said cloud server, wherein each of said specific contact point identifications are defined by unique string variables generated by said intermediary algorithm system;

3) initiating a request for cloud data program access by said individual, thereby activating said cloud server to request verification of said individual's actual identity in relation to said cloud data program;

4) requesting verification of the identity of said individual in relation to said cloud data program through communication with said intermediary algorithm system;

5) undertaking communication between said intermediary algorithm system and the required verification contact points associated with said individual and said cloud server such that substantially instantaneous determination of verification is accomplished through the reception of proper signals from said verification contact points by said intermediary algorithm system in response to requests sent from said system to each of said required verification contact points for that specific request, such that if the proper signals from all such required contact points are received then said intermediary algorithm system determines the individual, and thus said requested access to said cloud data program, is authentic and if any signals are determined improper, then said intermediary algorithm system determines said individual, and thus requested access to said cloud data program, is not authentic; and 6) transferring the results of step "5" from said intermediary algorithm system to each of said individual and said cloud server;

wherein said intermediary algorithm system provides verification notifications and responses to all parties without any required human interaction;

wherein said results transfer step of "6" is undertaken without the need for any input or disclosure of any personal information of said individual to said cloud server; and wherein said method is undertaken through the utilization of at least one computer program within a non-transitory medium.

This method further encompasses a method of accessing a secured cloud program within a cloud server, wherein said method involves presentment of an access initiating request to said cloud server, thereby prompting a request from said cloud server to verify the identity of the person providing said access initiating request, wherein said cloud server provides said request to a verification system, wherein said verification system then contacts said person through at least one set contact point requesting a response to indicate verification of said person's identity in relation to said secured cloud program, wherein if said person provides a proper reply to such a request from the proper contact point, said verification system then accepts the identity of said person to be verified and provides such a result to said cloud server, and if such identity is permitted entry to said secured location by said cloud server, then said system will permit access to said program to said individual.

For this inventive secure cloud data program verification and communication method, the term "cloud server" is intended to pertain to an overarching provider of a cloud computing protocol to permit multiple users access thereto in secure or non-secure fashion. The term "secure cloud data program" or just "cloud data program" is intended to encompass any such cloud server driven and/or provided program that is generated, uploaded, etc., by a cloud user and secured thereon and therein for limited access to only authorized users. Such a program may, as noted above, include any type of documentation, information, accounts (monetary or otherwise), basically any type of stored data that a person or other entity desires to be secure in this fashion. The term "individual" may thus pertain to a singular person, a family, or any other entity, whether a partnership, corporation, limited liability company, and other similar type of business entity, as the situation may require. The present invention may be implemented on a program or code that can be stored in a computer-readable (or electronically-readable) medium and that can be provided in a WAN environment. The overall system may be implemented onto a server using, as non-limiting examples, Apache web server, MySql on Linux, Oracle on Linux, Java servlets, Applets, HTML, JavaScript, Java, C#, and Microsoft's .NET, in such a manner as an individual or secure cloud data program provider would have access thereto on demand through a secure connection. Such a server may reflect implementation on the Internet, an intranet, or an extranet. Any software platform may thus be employed to implement the underlying algorithm system, such as JAVA, Linux, and the like, and the code itself may be written in any language, including, BASIC, COBOL, C+, C++, and the like.

The term "intermediary algorithm system" (or just "algorithm system") within this disclosure is intended to encompass the incorporation of a computer program as a conduit between the individual (or his or her proxy, in case the individual is, for instance, unresponsive or incapacitated to handle the set-up or other operations thereafter to respond or comment in relation to such a communication protocol), the cloud server, and the cloud data program itself (to some degree, at least), that includes the herein described and delineated VARSGR algorithm. Such a conduit thus serves as an information storage and operation source that further assigns string variables to all information inputted (whether during policy profile creation or at a time subsequent thereto) for security purposes and also includes communication capability to generate and send requests electronically to such verification contact points, the individual (or his or her proxy), and the cloud server for responses via the same electronic channels. The overall algorithm and the system in which it is employed for this inventive method is described in greater detail herein.

The inventive system thus includes the utilization of a string variable algorithm (Variable Assigning Request String Generator and Receiver Algorithm, or VARSGR, for short) to translate human language into machine language with the capability of applying unique characteristics (in this situation, variable strings) to each entity involved in the overall protocol (individual, cloud server, contact point individuals, etc.) in relation to specific signals, etc., generated from each entity's electronic media source to provide sufficient information for the system to reliably recognize the identity of the entities involved from the receipt of an access communication from such an electronic source alone. Furthermore, the system includes the capability of such individuals to modify the protocol set up for such verification purposes to also allow for varying levels of protection through changing the number and type of contact points as deemed necessary and/or desirable in relation to specific types of verification instances (such as, for instance, if the data is considered highly confidential and thus only accessible if multiple contact points are met in this respect for verification purposes).

More succinctly, the invention encompasses a computerized communication and verification system utilizing electronic media sources for communication between an individual (whether, again, in terms of singular person, business entity, etc., as the situation is concerned) and a cloud server that requests verification of such an individual's identity to permit access to a cloud data program. As well, in certain situations, the cloud server may be set-up with a list of actual individual identities that are permitted access to such a cloud data program and thus the verification system provides the determination of such a specific individual's identity that can then be correlated to the access list itself. In any event, the base (intermediary) algorithm system includes the initial creation of an individual account profile in relation to the pertinent cloud data program as well as the pertinent cloud server pro file in relation to such an individual and his or her secure cloud data program. Upon program account and/or device creation or subsequent thereto, as the case may be, each party (individual and cloud server) inputs profile information to allow for the intermediary algorithm system to distinguish the secure cloud data program itself in relation to the individual and cloud server identifications. Thus, a specific identification number (or like assigned label, such as a token) to provide specific identification of the secure cloud data program and the parties involved is generated such that the secure cloud data program information itself (such as individual name, individual address, etc.) is not transferred to the intermediary algorithm system, but the inputted information is sufficient for full identification to be permitted for all involved parties. The profiles thus also include verification contact point identifications for the intermediary algorithm system to access electronically at the moment of profile creation in order to generate specific string variables in association with all such contact points. In essence, the algorithm system contacts each contact point electronically with a request for specific verification thereof; upon receipt of such initial verification of identity, and, as well, confirmation from the individual directly that all such requests are proper, the algorithm system institutes the necessary string variables associated with each verification contact point required within each profile for a specific secure cloud data program. Once the algorithm system institutes these variables the contact points are indelibly identified within the context of the algorithm system and the string variables cannot be modified without re-establishing the profiles themselves through an entirely new secure cloud data program. In other words, once the contact points are set in terms of string variable identifications within the algorithm system, they cannot be altered without knowledge of both the individual and the cloud server. In effect, however, as alluded to above, such modifications will generally not be necessary. Thus, the string variables associated with specific verification contact points within both the individual and cloud server profiles provide the necessary verification capabilities upon establishment of the string variables associated therewith by the intermediary algorithm system. As such, the algorithm system is thus tied to specific electronic media sources (again, such as cell phone, email, text, and the like) that are utilized to not only set up the string variables for each required contact point associated with the individual and cloud server for the subject secure cloud data program (as noted above), but also to effectuate the necessary verification requests and responses thereto upon any attempt at a third party request involving the subject program and/or identification device. Thus, since each string variable is unique and is never duplicated, allowing for individualized identifications for each and every contact point for not only a specific secure cloud data program, but for every such verification method protocol created for all such programs and/or devices handled by that specific cloud server. In this manner, the algorithm system not only ensures every contact point associated with a specific secure cloud data program is unique and verifiable simply through the initiation and activation of the aforementioned individualized profiles created for each secure cloud data program (for both the individual and the cloud server in a separate manner), but that each contact point in total over the entirety of all such programs and/or devices are distinct and verifiable for accuracy and reliability, as well. As described herein, the inventive system, once the necessary profiles are in place, automatically recognizes the identity of the subject individual at issue and any and all other required verification contact points associated with a specific request for access to the secure cloud data program. This overall method is unique and heretofore unheard of within the context of cloud computing protections and verifications. As such, this is assuredly not a broad abstract idea, but a definitive process that requires specific method steps that have no past basis within this field.

Thus, within the context of this overall method, the term "proper signals" as it applies to communication between the intermediary algorithm system and all verification contact point requirements for each transaction within the profiles of both an individual and a cloud server in relation to a specific secure cloud data program is intended to reflect receipt of a response from all required verification contact points in reply to a request from the intermediary algorithm system. Such a response may be provided with an automatic reply (such as through an email, text, or cellphone platform) set-up by the individual specifically in anticipation of such a transaction. Additionally, a response through a specific reply code from, for example, the individual's immediate communication device (e.g., in his or her possession at that moment) coupled with an automatic or other type of set reply from any required verification contact point would be considered "proper" in this context since, as above, it is evident that the individual has specifically arranged for such a reply with the expectation that he or she is undertaking an identification verification or other program verification situation in relation to the pertinent secure cloud data program. If the individual misplaces or has stolen an identification card, number, electronic device, and the like, then all that is necessary to prevent a "proper signal" receipt by the intermediary algorithm system if such information is utilized in a third party request attempt is turning off an automatic reply, responding with a specific indication that the situation is "improper" (which can be read by the algorithm system as "improper" in that context), or even turning off or otherwise refusing a reply from any required verification contact point for that specific type of activity. Because the algorithm system has instituted string variables for each required verification contact point, any attempt to alter the source of a reply to a system verification request would be easily and suitably interpreted by the algorithm system as an "improper signal" since the request and response must be sent to and received from the same source indicated by a non-duplicated, unique string variable. Likewise, if an individual has his or her phone stolen, an additional required verification contact point (or more than one, for that matter) may still be employed for overall verification purposes. If only one reply out of at least two in response to an algorithm system request is considered true in relation to the requirements for contact for authentication purposes in relation to a specific transaction, then the signals would be considered "improper" and the transaction would be refused. Thus, if all requests and responses in this context are considered trustworthy, only then would the system consider such communications as "proper signals" and allow the request to proceed; if even one required verification contact point is deemed untrustworthy in this manner, then the system would consider such communications as "improper signals" and the request would be turned down. Such a situation applies to the verification contact point requirements set for each transaction within a subject individual's profile, as well. Furthermore, if the verification contact points of the individual or cloud server receive any requests from the algorithm system that are clearly improper (for instance, if the individual is not involved in a request at the time a request is sent, or if the intermediary algorithm system profiles for each entity are set in a specific manner for a secure cloud data program that is now being accessed, as examples), then either individual or cloud server may generate an overriding response to the system (such as, for instance, typing "NO" or "FRAUD" or like message) in reply as an authoritative demand for action to be undertaken at that moment. Although human interaction is thus not a requirement for verification contact points to send replies to the intermediary algorithm system, these types of exceptions and allowances are certainly possible, if desired and deemed necessary.

Hence, the invention further encompasses a procedure to undertake such a verification protocol in relation to an intermediary algorithm system to communicate between all entities involved within a secure cloud data program access request, and includes the more specific steps of:

1) during such profile set-up, said individual provides contact point signal identifications to said cloud server issuing said secure cloud data program;

2) said individual and/or said cloud server indicates the number and level of identity verification points needed per third party verification request and/or program account transaction subsequent to protocol set-up within said intermediary algorithm system;

3) subsequent to such profile set-up and intermediary algorithm system activation, said individual (or a proxy thereof) requests a secure cloud data program transaction and, optionally, provides a PIN, fingerprint, etc. (something that allows for initial identification purposes to initiate algorithm system activity), thereby activating a communication with said cloud server of such an action involving the subject secure cloud data program;

4) said intermediary algorithm system then receives a notification of such a request and/or account transaction initiation from said cloud server and determines the specific verification contact points requiring communication with regard to the specific request and/or transaction in relation to the profile information of both said individual and said cloud server;

5) said intermediary algorithm system then sends an electronic communication request to each such verification contact point seeking a reply thereto;

6) the individual's established contact point(s) then reply to said electronic communication request (such as through a text or email and/or through an HTML platform, as examples) in order to verify identity and intent to complete the request and/or account transaction, wherein said individual is not required to respond to any requests from said intermediary algorithm system;

7) said algorithm system receives such reply or replies from said verification contact points allowing for the ability to verify such points are associated with said individual for this purpose;

8) after verification of identity through as many verification points as defined by said individual and said cloud server, said intermediary algorithm system sends a notification via any electronic media to said cloud server indicating verification has been shown or not;

wherein the individual (and/or the cloud server) may opt to exercise auto reply in a standard email or text format for such a response to an algorithm system request, particularly if there are multiple verification contact points required for a specific request and/or account transaction (and that require substantial simultaneous reply for verification to be accomplished within the algorithm system), such that all such communications may be undertaken with the same electronic communication pathway or through any acceptable different pathway (such as all communications may be undertaken through as SMS protocol, in order to reduce bandwidth requirements or even in order to expedite new pharmacy requests when an individual or its proxy has the need for such without an already-established account therewith, for instance, or the system communication may be through SMS and a reply may be through a larger bandwidth platform); and wherein any attempted request and/or transaction without authorization within the defined timetable will cause system notification of any and all parties through any and all contact points and media available.

In general terms, then, the overall system thus depends on the implementation and utilization of the following algorithm, as presented in the following sequential steps:

1) Creation of offered subject matter (in this instance, verification contact points associated with a specific individual and cloud server for reliable transaction capabilities) followed by a search of a properly parsed database for individuals or personnel that meet the criteria associated with such subject matter as determined through the adoption of the string variable system (in other words, upon determination and disclosure of necessary verification contact points and identification information, said algorithm system will search for all such required signals/individuals/etc. within the necessary and/or supplied population database for pre-verification purposes);

2) The database then matches the string determining such a population and the IP addresses of a set population of the persons (or more succinctly, the required verification contact points) that meet such criteria (as set within the secure cloud data program profiles described above); the search stops when the string is finished through verification that those selected match all pre-determined criteria;

3) The database then sends communications to those people and only those people that the meet criteria for the subject matter involved (whatever is being offered); such a step is accomplished through string variables attached with human language (or machine language, if human interaction is unnecessary);

4) Those that receive communications in this manner then must respond with the text or email (anything else electronically) that they received; correlated machine language has to be in the response (through the string variable) and such a response must be sent from the address at which the person received it;

5) The system then matches all machine language subject matter returns (and thus all that include the string variable) from sent-to IP addresses from the group of persons that met the criteria pulls identities from the group to the string variables (with a finite count of possible persons to be selected in this manner);

6) When the matches are then made, the IP address and the profile including the embedded contact point(s) is pulled through the string variable as indications that the selected people wanted this result;

7) The system then responds with a confirmation that the person's (verified contact point, in this instance) desired result has been granted and then updates the database to remember the result and then not attempt to accomplish it again;

8) The person's (persons') profiles that meet the criteria and respond are then kept within the algorithm system as proper contact points with their verified signals in place.

Within the overall secure cloud data program verification and communication method described herein, the algorithm system is implemented to provide the necessary communication conduit as well as verification determination component to allow for an entirely automated process to be undertaken. Thus, upon creation of a cloud server profile within the algorithm system in relation to a specific secure cloud data program (and thus individual; or, possibly multiple policies and/or accounts for such an entity), the algorithm system will generate a specific string to bridge both entities together based upon random variables that become set for that specific purpose. As well, once an individual creates his or her or its profile in relation to a program (or programs) and/or device (or devices), a different string is generated that relates to the string for the specific cloud server for that specific secure cloud data program (or plural therefor). Once the profiles are then created, and verification contact points are specified by both the individual and the cloud server (and are kept separate and unknown by the other entity), the algorithm system then creates a string for each such contact point that initially sets the variables associated with each contact point that cannot be altered. Any other contact points added later by either entity will also be assigned a string variable in a like manner. Thus, once these strings are generated and incorporated within each profile, the individual or cloud server may set any requirements as to actual communication with any number, sequence, etc., contact point to ensure algorithm system requests will be sent to such necessary addresses (email, text, phone, etc.). Since each contact point is controlled by a specific string, any deviation from that specific identification string (such as a different phone number, a different email address to which an initial request has been forwarded, as merely examples) will result in a determination of an improper contact point. Likewise, if the response generated to the algorithm system request does not correlate to the set string for such a required contact point, then verification fails and the transaction is not allowed to proceed. As noted below, the sheer number of available string variables allows for specific contact point identifications in such an exact manner that there is no feasible way to break such a protective combination. The same potential resides with the profile for the cloud server, with the added capability of actually having the string variables (in table form) for each necessary verification contact point continuously rotated, reversed, switched, etc., in order to add a further level of security.

BRIEF DESCRIPTION OF THE DRAWINGS

FIG. 2 is a flow chart of an initial set up for the method of FIG. 1 between an individual and a cloud server.

DESCRIPTION OF THE INVENTION

Figure 1:
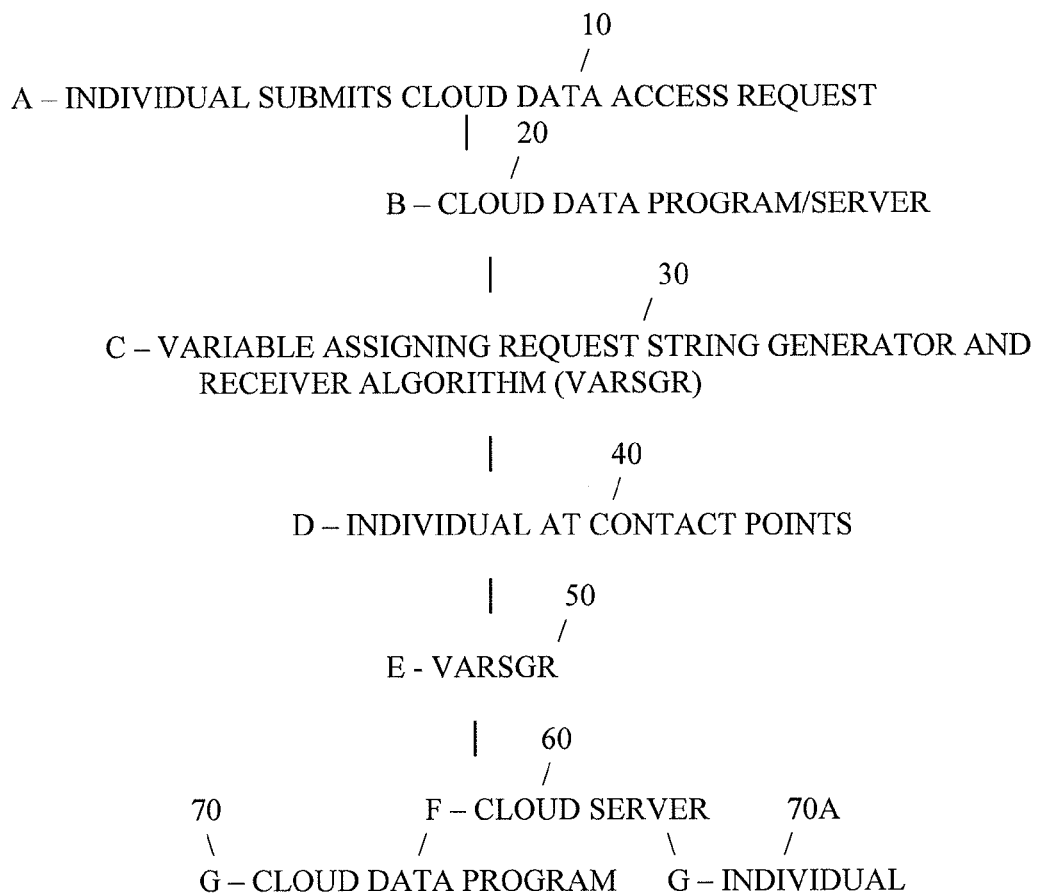
FIG. 1 is a flow chart of one possible embodiment of a potentially preferred governmental issue program verification and communication method (here a voting registration method).

As noted above, the key to the overall effectiveness of the inventive verification and communication protocol is the utilization of the VARSGR algorithm. This string variable algorithm allows for the reliable connection between individual, cloud server, and cloud data program, potentially, and verification contact points, at whatever level and/or number required for such purposes. Such string variables allow for an inordinately high number of variations of identification possibilities in relation thereto, thereby allowing the system to not only easily distinguish one individual from another, as well as one contact point from another, through a simple text or email (since the initial confirmation of identity directs the system to apply string variables to each individual, contact point, cloud server, third party, etc., that are then related specifically to those persons, contacts, etc., alone).

The algorithm itself, as noted previously, is referred herein as variable assigning request string generator and receiver. In greater summation from above, this algorithm is provided in a manner in which all searchable criteria are assigned a variable using the letters of the alphabet and the numbers 1-9 to create a string of variables that can be sent via any electronic media which may include but is not limited to SMS or email. These texts or emails can include other information. This information may be viewed, read, or acquired by either human or digital systems to solicit a positive or negative response. These responses are differentiated in the fact that a positive response is viewed as a reply to a request via any electronic media including but not limited to SMS or email. The individual, contact point, etc., responses are then received by the algorithm and evaluated for authenticity by verifying individual, contact point, etc., identities through matching the string (request)(which is time-stamped upon generation by the algorithm system variables) sent to a verification contact point email address, IP address, and/or cell phone number with the email address, IP address, and/or cell phone number from which the necessary response to the string is received. With the string variables in place and associated with each original or modified verified contact point, any lack of matching of string variables at a later time would indicate the contact point is not authentic and a fraudulent activity is taking place.

If the individual, contact point, etc., response is found to be valid, the algorithm then matches each string variable to the system search denoted by each variable to evaluate that a matching request is still available and that the individual, contact point, etc., still meets all requirements of the sent request. As well, although such a system is designed to act substantially instantaneously, in actuality, it will hold the overall instance or transaction open until the required number of responses with strings is achieved after the algorithm system sends its initial requests (or until the system is effectively timed out without having received a response from every required verification contact point). If a matching request is still available, the algorithm sends confirmation to any and all known addresses of an account holder, contact point, etc., responder through all available electronic media that such a response was accepted and updates any and all databases used by the algorithm system. The database in this situation is the aforementioned intermediary algorithm system acting as, basically, liaison between the individual, cloud server, and cloud data program (or a list present within the server indicating all individual identities permitted access to such a program). The matched contact point, individual, etc., response is then archived within the algorithm system for further verification purposes. If a contact point is changed by the individual or cloud server for any transaction, then proper notification is also provided both entities, both to ensure such requirements will be understood and further properly handled in the future, as well as to alert all involved that such a modification has been applied. If the modification has not been requested, the algorithm system can thus be properly alerted itself and such a change can be prevented.

The capability of the overall system is that the algorithm may be utilized to dial in a specific "lock" mechanism for any type of transaction in relation to the verified contact point number and type. With the string variable configuration, this algorithm can thus provide 1,679,616 different assignable variables for each definable search criteria entry by utilizing the upper case alphabet and the numbers 1-9 in combination of 4 characters, as one example. Although probably unnecessary, the algorithm has the capability, as well, to incorporate lower case alphabet characters which would increase the assignable variables per 4 character combinations to Ser. No. 14/776,336, and even further if larger character combinations or even other symbols (Greek letters, graphic symbols, such as &, *, and the like, as, again, merely examples) are employed. Basically, the capability of the algorithm system to apply string variables for identification purposes is, ostensibly, infinite, with the only real limitations based upon human and/or hardware capabilities. As such, the scalability of this overall algorithm system is, again, potentially infinite as the combinations available for contact point purposes are truly astronomic in number. Thus, the capability of adjusting any profile verification requirements may be made as many times as desired or required by the individual and/or cloud server in order to ensure that repetition of the overall contact point requirement protocol will not result in fraudulent card activity due to hacking or other type of improper action. Furthermore, the cloud server may also choose to undertake a simple reversion of the pertinent profile string variable tables thereby changing the string variable request(s) sent without changing any functionality or view seen by the individual, and, perhaps more importantly, without any need to undertake programming changes within the software code. In this manner, the security levels may be increased exponentially without any functionality, programming, or format change, and at the cloud server level, thus preventing any definitive hacking capabilities since the individual will have his, her, or its own standards in place that may or may not be accessible by the cloud server. The lack of crossover in terms of requirements set for algorithm verification contact points for any account, or even as low on the pyramid as a specific type of transaction within any account, thus allows for even greater levels of security with a (substantially) instantaneous verification system.

Additionally, to further show the benefits and highly unexpected value of this inventive algorithm, multiple search criteria are placed in the request producing the string variable. To ensure this system will allow for utilization with even the oldest SMS platform, the string variable has been limited to a maximum of 23 separate classifications of definable criteria for matching string variable with database information. These oldest available SMS platforms have 142 character limitations. The reason the 23 separate classifications of definable criteria is not the product of 142 divided by 4 is that the system uses specific symbols to locate the beginning and ending of the string variable and breaks are denoted with other specific symbols between variables. Again, these combinations can be scaled to any number, dependent upon the selected levels of variable capabilities defined by the hardware employed or human element involved. Thus, again, the numbers provided above are non-limiting examples of the effectiveness and capability of the algorithm system described herein.

The number of classifications needed and the priority of each classification is dictated by the database algorithm pertaining to setting priority of search classifications such as, for instance, considerations such as color, date, common name given to item, and any other criteria that database operator wishes to use to filter for a particular item or service (here, for instance, in relation to providing required verification contact points to ensure a cloud data storage access request is true). It is the matching of these generated string variables to the individual's/contact point's variable assigned that allows the system to move under one instance therefore allowing requests for verification purposes and allowing full functionality of the underlying system.

Thus, the inventive system provides effective and all-encompassing verification capabilities between an individual and a cloud server to permit access to a secure cloud data program by creating a string of variables that can be sent and received via multiple electronic media. Such a medium is preferably a cell phone (of any type that allows for texting, emailing, or other type of textual communication), for obvious reasons. Additionally, the system may function properly through a user's computer, whether embedded within a laptop, tablet, desk top, or other large type, platform. Additionally, any wireless system that provides communication capability of the voice, text, email, etc., variety, such as a wrist-placed device, eyeglass device, and the like, may be utilized in this manner, too. The variables are assigned in relation to a request sent to an individual, contact point, etc., over such a medium and upon confirmation of identity by verifying the contact point from which the response with strings came from is the actual contact point to which a request with strings was sent.

The system may be further implemented through the utilization of suitable readable screens incorporating requests, transaction details, transaction confirmations, request acceptances, transaction cancellations, etc., whatever communications are undertaken over such a medium for this purpose. These are provided below as merely non-limiting examples of possible screens including such information. The simplicity and effectiveness of the overall system is evident and is permitted through the above-described algorithm. Without the string variable capabilities, human interaction and involvement would be paramount to guarantee each request and procedural step is implemented properly and for the correct individual and/or cloud server. The ability to relate the other considerations to this initial system provides highly effective extra benefits that make the overall system that much more attractive, particularly in terms of an all-in-one process that eliminates the need for workforce involvement beyond the potential for emergency calls due to unexpected system shutdown.

One major component in the operation of the VARSGR algorithm system is that the string is sent to profiles which meet all search criteria so that only those users listed in the subject individual profile associated with a specific account receive information. The system certifies that the contact point to which the string is sent is the same contact point from which a response is received. Without this guarantee, the overall system would most likely fail. The enhanced security provided through the string variable capability in this manner, particularly without any need for human interaction, has heretofore been unexplored within the secure cloud data program verification area.

As such, the system then matches the strings together for the verified contact points contacted thereby. Once the number of each response level is then achieved (which should be nearly instantaneous, up to about 20 seconds in duration, preferably within 10 seconds, more preferably up to 6 seconds, as merely examples; as noted, such requests to and responses from verification contact points should take less than one second to complete such verifications, thus providing a proper description of the term "substantially instantaneous"), the VARSGR system then sends a message of such a result to the individual (person, business entity, as the case may be, etc.) and allows the transaction to proceed (as well, communication with the cloud server and, ultimately, the third party involved, may also be implemented in this manner and for this purpose). This string variable thus verifies the true identity of those responding to such requests for responses without the need to request or divulge any personal information in the process. If, for example, a string is sent from a contact point to which the system did not initially send a string, the system identifies this as fraud and notifies the other parties involved needing such information of a fraudulent action.

The security of the string variable algorithm system is such that messages cannot be intercepted and/or forwarded. Basically, the action of matching the strings from the point of response to the contact point to which the string was sent precludes any such interruptions, particularly as the speed of such signal transmissions are much too fast for any other actions to commence in that respect.

In addition, the string variable accords the individual further flexibility by permitting the utilization of profiles with different levels at the same time. As alluded to above, such a potential situation allows for set profiles (or modified, as the case may be) to include certain response criteria, rather than all standard types for all types of transactions. Thus, the system may be required to communicate with specific contact points through specific email addresses or cell numbers for certain transaction types, not to mention the potential necessity for an increase in contact points, as well, all in order to increase security protocols for certain transaction situations.

The capability of modifying required verification contact points on demand through activation and/or deactivation of specific profiles associated with a secure cloud data program further increases the security features involved. This is particularly impressive as it may be accomplished without any need for new software or hardware, only a request from a verified individual in relation to the algorithm system (with a proper verification for such a request to be made to the system). If an individual or cloud server seeks to modify the necessary contact points within their specific system profile for any type of transaction, either entity may simply send a communication in some electronic manner (text, email, etc.) to make such a change. As noted above, any such modification will elicit an algorithm system communication to all profile verification contact points to ensure such an adjustment is desired and proper of the pertinent entity. Additionally, since there may be an unlimited number of profiles associated with each user account, and, furthermore, an unlimited number of levels of security through contact point requirements, at least, for each account, as noted above, the system itself is basically infinite in scalability for such security purposes. Thus, the string variable algorithm allows each individual access to what is in effect a potentially ever-changing combination lock with password protected access points, all with the ability to ensure any such changes are monitored for authenticity as well. In addition, through the use of the most efficient means for transfer of desired data from internet searches, bandwidth use is reduced up to 66 times resulting in much greater efficiency (such as through the utilization of SMS for all communications to reduce bandwidth requirements for low-cost operations).

An electronic transaction may be blocked until a multiple of user identification verifications can be met (up to a set time limit, such as, as examples, 1 minute, 45 seconds, 30 seconds, 20 seconds, as low as 10 seconds, if desired) as dictated by transaction criteria that are set within the profile requirements. The number and nature of verification points may be specified by the user or cloud server involved in the verification request and/or account transaction. To the contrary, the prior protective measures undertaken in this vein have been shown to have high operating costs, large equipment investment, and/or inconvenient use or infringement upon individuals' privacy.

Through the utilization of the VARSGR algorithm within the above-described verification and communication method, all parties involved, the individual, the cloud server, etc., are thus accorded the greatest degree of reliability that any requests for access to a secure cloud data program undertaken through such a method are verified and proper. If a person's account information, personal information, cards, etc., are stolen, any attempts to utilize an identification device or seek program access by an unauthorized individual would be easily thwarted as the bad actor would not have the ability to timely and/or appropriately access the required verification contact points for the algorithm system request and response protocol. Thus, even with such account information, including passwords (if included) and other possible verification considerations, the lack of algorithm contact points would prevent any processing of such an initiated illegal transaction.

Furthermore, the ability to, as noted above, modify the required contact points from either the individual's or the cloud server's profile in relation to a specific secure cloud data program in any manner, such a regular adjustment on a daily, weekly, bi-weekly, etc., basis, further complicates and thwarts any invasive attempts. In essence, the capability of assigning specific verification contact points that must be not only in receipt of requests from the algorithm system, but also the source of responses back to the algorithm system for each and every request, transaction, etc., initially provides a nearly impregnable barrier to attack by bad actors. The further ability to modify such required verification contact points on demand provides an even higher level of protection, akin to having continuously adjusting combination locks on either side of a transaction door. Since the individual sets the combination on demand (with, again, the combination being the required verification contact points that must receive and respond to algorithm system requests) on one side (within the above-described algorithm system individual profile) and the cloud server sets the combination on the other side (through its own algorithm system profile), any modifications made on either side (which, again, do not affect the requirements of the other side) would easily prevent any attempts to hack into the system itself. Any such invasive hacking would not provide any determinative requirements information, initially, let alone the undertaking of such a possible activity would be not only exhausting, but cost prohibitive. Additionally, even if such a situation were to possibly occur, the algorithm system would not have any personal or other secure cloud data program information, but hard to decipher language which would be worthless to such a bad actor. Lastly, if the intermediary algorithm system were shut down, the lack of such activity would automatically prevent any transactional processing.

The following shows the implementation of such a system in one manner well beyond a typical secure cloud data program verification protocol.

DESCRIPTION OF THE DRAWINGS AND PREFERRED EMBODIMENTS

Without any intention of limiting the breadth and scope of the overall inventive method, the following descriptions of the accompanying drawings provide one potentially preferred embodiment of the utilization of the aforementioned inventive algorithm as implemented within a secure cloud data program access request verification process.

FIG. 1 is a flow chart depicting certain method steps to accomplish the desired secure cloud data program access verification result. As shown, step A 10 denotes an individual submitting a request for such access to the cloud data program housed on a pertinent cloud server. The individual may input a private identification number, ZIP code, or other type of signature (including a finger print or other biometric device, if desired), or the system may automatically uncover the expected identity of the individual through such an initial action. Step B 20 then shows the cloud data program itself (within the overall computer program implemented within a non-transitory medium) sending a request for verification to the cloud server regarding the identity of the access requesting individual. The cloud server then sends an electronic message (through the same computerized format) to the verification algorithm system (step C 30) effectively requesting that system to approve the request for individual identity verification at a specific contact point or points. The individual then receives such identification verification requests through multiple electronic media in simultaneous (or as soon thereof) fashion (Step D 40). Such media thus may include, as noted previously, multiple cellular devices, email accounts, or HTML platform accounts (or a single account) that is accessible through a login and password protocol. Step E 50 thus shows the individual reply from such required communication media devices in order to satisfy the requirements requested by the cloud server. These actual replies may be separated by levels in accordance with multiple different contact points within the individual's identification device verification system. As described above, these levels may be provided in such a manner as to permit the individual the ability to activate such a request and/or account upon an emergency situation (again, such as being incapacitated for response purposes) that allows for automated response from certain identified contact points within aforementioned specific levels for such a situation, thus allowing the cloud server to provide a access approval process as needed. Step F 60 depicts the response (or responses) provided to the algorithm system from as many different levels as directed by the cloud server to allow for directed verification to occur. Thus, the algorithm system verifies the contact point response sent from each contact point to which a request for response has been sent in reply to the cloud server request. Any responses that arrive from a contact point that is different from or falsified requires notification to the cloud server of attempted fraud. In such a situation, the individual him- or her-self may also be notified if the cloud server directs such an action (or, alternatively, if the agreement between individual and cloud server requires such an action). If all responses from the required contact points are verified for authenticity, and the number and required response levels set by the cloud server are met by the algorithm system, then the cloud server is notified in suitable fashion to allow the verification request to be sent and the indications of voting measures to be provided to ensure the proper person is voting and such person has yet to vote in that specific election. Step G 70, 70A then shows the cloud server sending approval to the cloud data program 70, as well as the individual 70A, to proceed with the access request. The overall method shown in steps A through G 10, 20, 30, 40, 50, 60, and 70, 70A is undertaken nearly instantaneously, with a general maximum time frame of up to 10 seconds, preferably at most 5 seconds, and most preferably at most 2 seconds. With the algorithm in place to provide the necessary verifications, the system is capable of providing the necessary verifications and responses, etc., with such speed, specifically because of the reliability created by the algorithm itself to ensure such communications are made between the proper individual and server. An app or other type of electronic system may be employed, as well, to the same effect. This system could thus allow for each registered voter to be verified and the number of votes associated therewith all active voters in a specific election may be properly recorded and assessed for accuracy.

FIG. 2 shows the set-up flow chart to initiate the algorithm system in relation to a cloud secure data program creating individual and a specific cloud server. Step AA 100 shows the individual providing all requested data to the specific cloud server pertaining to the security level of the program as well as all information needed to create a suitable secure verification profile for future access thereto on the cloud server. Such information includes individual identity information, individual communication information, including cell phone number, email address, etc., (as well as all other authorized individuals' like information if more than one such person is permitted access to such a secure program) to permit electronic media notifications and the like. Such information also includes the collection of information pertaining to desired verification contact points for inputting within the algorithm system. In this manner, as noted above, different levels of security and availability of reliability throughout the overall security protocol may be provided both the individual and the cloud server. The algorithm system is able to receive such information, format it, and implement it in relation to the user pursuant to the contact point requirements and verification requests in such a specific manner. Step BB 200 shows the cloud server generating a profile model for the individual in a format to submit to the algorithm program. Such a profile model may thus include any number of commonly used platforms including, but not limited to, excel and exports profile information. This system may thus permit such a profile model to reliably convert the individual's identifying information, or other type of identification indicia, including, for instance, biometrics (which are not totally reliable for identification verifications, but may be possible to use as initiators for requests and/or account transactions in this manner) into an identity number to prevent any potential problems should a theft attempt (through, for example, hacking of the cloud server's computerized system or even, though highly unexpected, the algorithm system itself in some manner). The cloud server then also sets response criteria and submits the same to the algorithm system in relation to any desired protocols or requirements set by the server alone or in conjunction with the individual's own specifications. As alluded to above, such response criteria may involve differing levels of verification from more or fewer contact points dependent upon location of health care professional, amounts of transactions, or other like considerations. Step CC 300 thus shows the algorithm system (here VARSGR, again) receiving such cloud server information of Step BB 200 and creating its own profiles for the individual. In this manner, and, again, in relation to the specifics required by the cloud server in relation to each individual user, to best ensure reliability of the overall verification process, such profiles should be related to multiple profiles of different verification levels. The algorithm system then sends secure login and password information for each such profile to the cloud server and/or user (as directed by the user and cloud server agreement and/or cloud server policy). In this manner, the user may actually change any contact points for verification purposes as he or she sees fit without any need to notify the cloud server, only the algorithm system. With the password, etc., in place, such modifications, if undertaken, are assured reliability, particularly since the algorithm system will also have the initial communication protocol for such reliability purposes already in place with the specific user, thus indicating all the necessary algorithm requirements for any transactions involving the user and the cloud server are in place Step DD 400. Thus, if a request or response for verification comes from a different communication source than is known by the algorithm system, then such a request will be refused and proper notification to the cloud server and/or other contact points (if available) will be made to alert such an attempt, up front, has been made. In this manner, the system itself is as foolproof as it possibly can be, providing such protections throughout the entirety and over the duration of the account life. Likewise, if the individual (or other permitted access individual) changes cell phones, email addresses, etc., the algorithm system can be alerted properly and reliably since the algorithm itself will already have the ability to reliably identify the individual through the initial set-up and further contacts. Furthermore, as noted above, if the cell phone and/or email communication protocols are lacking are suspected of an invasive activity to potentially steal an identity or other action, the user further has the capability to provide contact points for verification points through access to an HTML portal(s) via a login and password, again set by the algorithm system or, alternatively, without any necessity for such a login procedure. In any event, once the profiles and VARSGR contact points have been properly established, the algorithm system is ready to use and the user can then utilize his or her credit card as desired with the verification process for reliability for both him- or her-self and the specific cloud server(s), as well. If such modifications to contact point requirements are made subsequent to profile creation (and thus after the subject storage data program access request protocol set-up between the individual and the cloud server), then such changes will automatically require response to requests from the intermediary algorithm system of each contact point within both profiles in order to ensure verification of such a modification. Furthermore, there is basically no limit to the scalability, capability, or utility of this overall system requiring the VARSGR algorithm in order to provide effective communication between parties to a policy request and/or account transaction is intended with the descriptions and depictions herein, either.

Thus, the preceding examples are set forth to illustrate the principles of the invention, and specific embodiments of operation of the invention. The examples are not intended to limit the scope of the method. Additional embodiments and advantages within the scope of the claimed invention will be apparent to one of ordinary skill in the art.

What is claimed is:

1. A computerized verification and communication method between an individual or his or her proxy and a cloud server, said method including the utilization of electronic communication devices by said entities and comprising the steps of:

1) initiating a protocol between said cloud server and said individual through an intermediary algorithm system in relation to a secured cloud data program for which said individual requests access within said cloud server, wherein said protocol includes the generation of a profile for said individual and a profile for said cloud server within said intermediary algorithm system, wherein said individual profile and said cloud server profile both include a unique number generated in relation to the identity of said individual, as well as verification contact point requirements to be undertaken by said intermediary algorithm system upon utilization of said cloud server for such an access request, and wherein said individual's personal information is not shared with or otherwise stored within said intermediary algorithm system;

2) establishing specific contact point identifications with said intermediary algorithm system through an initial communication with each required verification contact point within both profiles of said individual and said cloud server, wherein each of said specific contact point identifications are defined by unique string variables generated by said intermediary algorithm system;
3) initiating a request for cloud data program access by said individual, thereby activating said cloud server to request verification of said individual's actual identity in relation to said cloud data program;
4) requesting verification of the identity of said individual in relation to said cloud data program through communication with said intermediary algorithm system;
5) undertaking communication between said intermediary algorithm system and the required verification contact points associated with said individual and said cloud server such that substantially instantaneous determination of verification is accomplished through the reception of proper signals from said verification contact points by said intermediary algorithm system in response to requests sent from said system to each of said required verification contact points for that specific request, such that if the proper signals from all such required contact points are received then said intermediary algorithm system determines the individual, and thus said requested access to said cloud data program, is authentic and if any signals are determined improper, then said intermediary algorithm system determines said individual, and thus requested access to said cloud data program, is not authentic; and
6) transferring the results of step "5" from said intermediary algorithm system to each of said individual and said cloud server;

wherein said intermediary algorithm system provides verification notifications and responses to all parties without any required human interaction;

wherein said results transfer step of "6" is undertaken without the need for any input or disclosure of any personal information of said individual to said cloud server; and wherein said method is undertaken through the utilization of at least one computer program within a non-transitory medium.

2. A method of claim 1, whereby subsequent to undertaking said access request, said cloud server requests identity verification from said individual or his or her proxy; wherein said communications are undertaken through the utilization of said algorithm system and thus no personal information of said individual is transferred during such a communication.

3. The method of claim 1 wherein said individual profile includes more than one verification contact point requirement per each verification request and/or account transaction.

4. The method of claim 3 wherein said individual may modify the number and level of verification contact points requirements within said individual's profile subsequent to initial intermediary algorithm system profile set-up.

* * * * *